Dec. 12, 1961   F. A. GUERTH   3,013,147
COMMUNICATION SYSTEM
Filed April 25, 1960   3 Sheets-Sheet 1

INVENTOR.
FRITZ A. GUERTH
BY
Howard J. Murray Jr. AGENT
George J. Rubens ATTORNEY Dec. 12, 1961          F. A. GUERTH          3,013,147
COMMUNICATION SYSTEM
Filed April 25, 1960                        3 Sheets-Sheet 2

INVENTOR.
FRITZ A. GUERTH
BY
Howard J. Murray, AGENT
George J. Rubens, ATTORNEY

Dec. 12, 1961     F. A. GUERTH     3,013,147
COMMUNICATION SYSTEM

Filed April 25, 1960     3 Sheets-Sheet 3

INVENTOR.
FRITZ A. GUERTH 3,013,147
COMMUNICATION SYSTEM
Fritz A. Guerth, 50 Lori Road, Camarillo, Calif.
Filed Apr. 25, 1960, Ser. No. 24,631
10 Claims. (Cl. 250—6)
(Granted under Title 35, U.S. Code (1952), sec. 266)

The invention described herein may be manufactured and used by or for the Government of the United States of America for governmental purposes without the payment of any royalties thereon or therefor.

The present invention relates to the transmission and reception of radiant energy. More particularly, the invention relates to a communication system in which data, which may be in the form of pulses, is transmitted and received in such a manner as to efficiently utilize a given portion of the frequency spectrum.

It is becoming of increasing importance to be able to transmit many different types of intelligence from one location and to receive such information at a remote point. Mechanisms in general are becoming more and more complex in nature, and each separate component or combination thereof is subject to change and/or failure throughout the period during which the mechanism is in operation. When the latter is under direct manual supervision the problem of detecting these changes when they occur is not too difficult of solution, but when the mechanism is at a remote point, or is unattended for even a portion of its operating cycle, it is highly desirable that means be provided whereby the status of any particular element or assembly may readily be ascertained. If the condition of the component or unit under observation does vary in an undesirable manner, such variation may often be corrected or compensated for before serious harm results or before the change in component status threatens to preclude continued optimum operation of the overall system.

A specialized application of the above-stated problem lies in the field of guided missiles, where many different types of information are required to be obtained and translated into a form which permits either (1) immediate observation or (2) recording on tape or some other permanent medium for subsequent inspection and evaluation. Not only is it helpful to land-based personnel to be aware of the status of a large number of missile components subsequent to a launching operation, but other information, such as that relating to meteorological conditions, is of paramount importance in satellite projects and other activities dealing with the earth's atmosphere and with the outer space exploration. The many different bits of data to be derived and communicated normally require a very wide transmission band which preferably lies in the upper portion of the frequency spectrum due to the short time interval between the development of successive items. This upper region of the spectrum is even now over-crowded, so that objectionable interference with other transmissions is likely to occur. Misleading or even inaccurate reception can thus result.

The efficient utilization of a frequency band so as to maintain this band of minimum width for any given amount of intelligence to be communicated has received considerable attention. Many forms of multiplexing arrangements, such as those founded upon a time-sharing or frequency-sharing basis, are known and used. These are generally satisfactory to satisfy the particular requirements for which they were designed, but they are almost without exception quite complex in nature and highly critical in their operation.

Conventionally modulation of a sub-carrier wave is given over to the conveyance of information respecting a single phase of operation of a particular device or mechanism unless some form of signal multiplexing is utilized. For example, the sub-carrier may be modulated by a series of pulses, the time spacing between successive pulses being representative of the instantaneous angular position of a shaft or some other rotatable member the condition of which it is desired to monitor. Purely as an illustration, this shaft may be one on which the indicator of a temperature-measuring device is mounted. These pulses, however, normally extend in a single direction of polarity, and hence such modulation of a sub-carrier wave can often be brought about by more or less conventional circuitry.

When two separate conditions are to be communicated by a single sub-carrier, however, the situation becomes more difficult of satisfactory solution. Maintaining separation between two waves respectively representative of two conditions to be indicated, when no time-or frequency-sharing apparatus is employed, requires highly selective filters or other networks which have heretofore possessed inherent disadvantages pertaining either to efficiency of operation or to manufacturing and maintenance costs.

In accordance with a feature of the present invention, two separate channels of information may be transmitted on a single sine-wave sub-carrier by utilizing the positive portion of the wave to convey the intelligence in one channel while the negative portion of the sub-carrier conveys the data in the remaining channel. This is broadly accomplished by developing a second sine-wave which is phase-reversed with respect to the carrier and of twice the carrier amplitude. Certain positive half-cycles of this phase-inverted and amplitude-doubled wave are then selected in accordance with the data in one channel, while certain negative half-cycles of such wave are selected in accordance with the data in the remaining channel. Such selected half-cycles are combined with the original sub-carrier for transmission. When so combined, the resulting modulated sub-carrier contains three successive half-cycles of the same polarity, the center one of which is representative of information occurring in that particular channel with which it is associated. At a receiver, a sine-wave is generated which is substantially identical to that of the original sub-carrier except that it is reversed in phase. When this phase-reversed wave is combined with the wave containing the two channels of information, energy cancellation is complete except for the particular half-cycles representing the data of interest. The latter are applied to an oscilloscope for visual observation or to a recording apparatus for impression on a tape or other storage mechanism.

One object of the present invention, therefore, is to provide an improved form of communication system.

Another object of the invention is to provide a system by which two channels of information may be transmitted on a single sub-carrier wave.

An additional object of the invention is to provide a system in which the positive portions of a sub-carrier wave are modulated in accordance with intelligence to be conveyed in one transmission channel, and the negative portions of the sub-carrier wave are modulated in accordance with intelligence to be conveyed in a second channel.

A still further object of the invention is to reduce the band width required for transmission of a given amount of information without the necessity of employing multiplexing devices or other complex circuit arrangements.

Other objects and many of the attendant advantages of this invention will be readily appreciated as the same becomes better understood by reference to the following detailed description when considered in connection with the accompanying drawings wherein.

Figure 1:
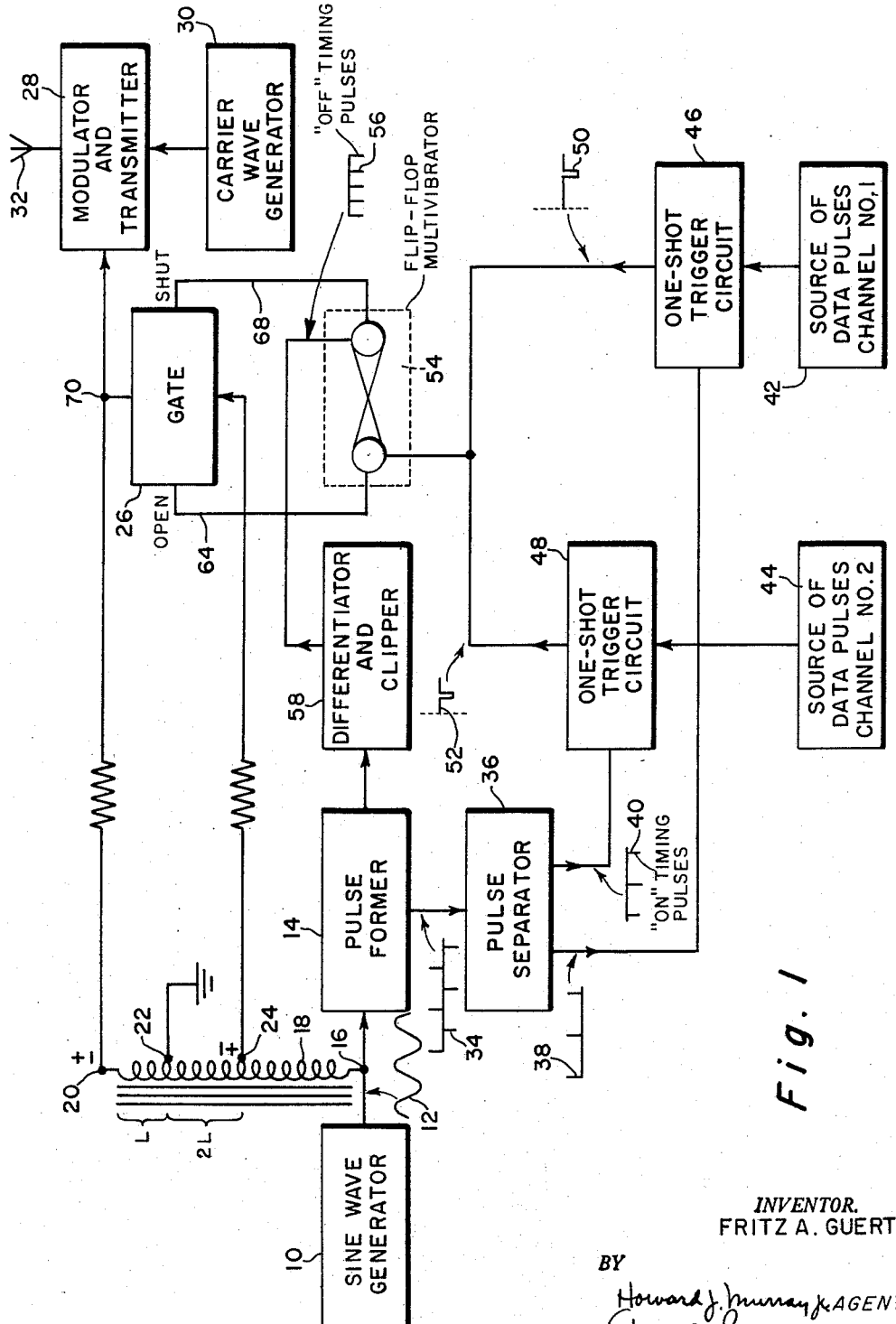
FIG. 1 is a schematic diagram, partially in block form of a transmitting circuit designed in accordance with a preferred embodiment of the present invention.

Referring first to FIG. 1 of the drawings, there is shown a transmitting system which incorporates a conventional voltage generator identified in the drawing by the reference numeral 10. Generator 10 is adapted to develop an output of sine-wave configuration, as indicated by the reference numeral 12. The wave 12 is applied both to a pulse former 14 and also to one terminal 16 of an iron-core inductance 18 having a further terminal 20 and two output taps 22 and 24 spaced therealong. The tap 22 on inductance 18 is grounded, as shown in the drawing, and the location thereof, as well as the position of output tap 24, is so chosen that there appears at the inductance terminal 20 a sine-wave identical in frequency and phase to the wave 12. This sine-wave appearing at the inductance terminal 20 is identified in FIG. 2 as wave (a). The peak-to-peak amplitude of wave (a) is in no sense critical, and is dependent upon the power capabilities of the generator 10 as well as the design of the associated circuitry.

As indicated in FIG. 1, the number of turns (L) of the inductance 18 lying between the terminal 20 and tap 22 is chosen to be half the number of turns (2L) lying between the taps 22 and 24. Thus the voltage variation derived from the inductance tap 24 will not only possess twice the amplitude of the wave appearing at terminal 20, but will also be inverted in phase with respect to the latter. The phase-inverted and amplitude-doubled wave thus derived from inductance 18 (wave (b) in FIG. 2) is applied to a gating circuit 26. The phase and amplitude relationships of the two waves (a) and (b) in FIG. 2 can readily be ascertained from the drawing.

It will be noted from FIG. 1 that, as will later be shown, the output of gate 26 (consisting of selected half-cycles of wave (b)) is combined with wave (a) and this combined wave applied to a modulator and transmitter 28 which also receives a carrier wave generated by a conventional oscillator circuit 30. The resulting energy is transmitted in standard fashion from antenna 32. It should be emphasized that the sine wave 12 from the generator 10 is identical in frequency and phase to the wave (a) in FIG. 2 derived from the terminal 20 on inductor 18.

The voltage variation 12 is acted upon by the pulse former 14 so that an output pulse from the latter is developed each time that the wave 12 passes through zero. That is, the sine-wave 12 is translated into a series of pulses of alternate positive and negative polarity, shown as 34 in FIG. 1 and as the wave (c) in FIG. 2. Networks for performing such an operation are well known in the art, and hence no details as to the actual circuitry employed have been illustrated. In the same manner, a further network 36 separates the pulses 34 into two waves 38 and 40 each of which includes pulses of a single polarity. As shown by the two waves (d) of FIG. 2, the pulses 38 separated from wave (c) extend in a positive direction of polarity, while the separated pulses 40 extend in a negative direction. It will be recognized that there is a definite time relationship between the pulses 38 and 40 and the cyclic repetition frequency of the sine-wave 12, and hence the pulses 38 and 40 will hereinafter be referred to as "on" timing pulses for reasons which will become apparent as the description proceeds.

Figure 2:
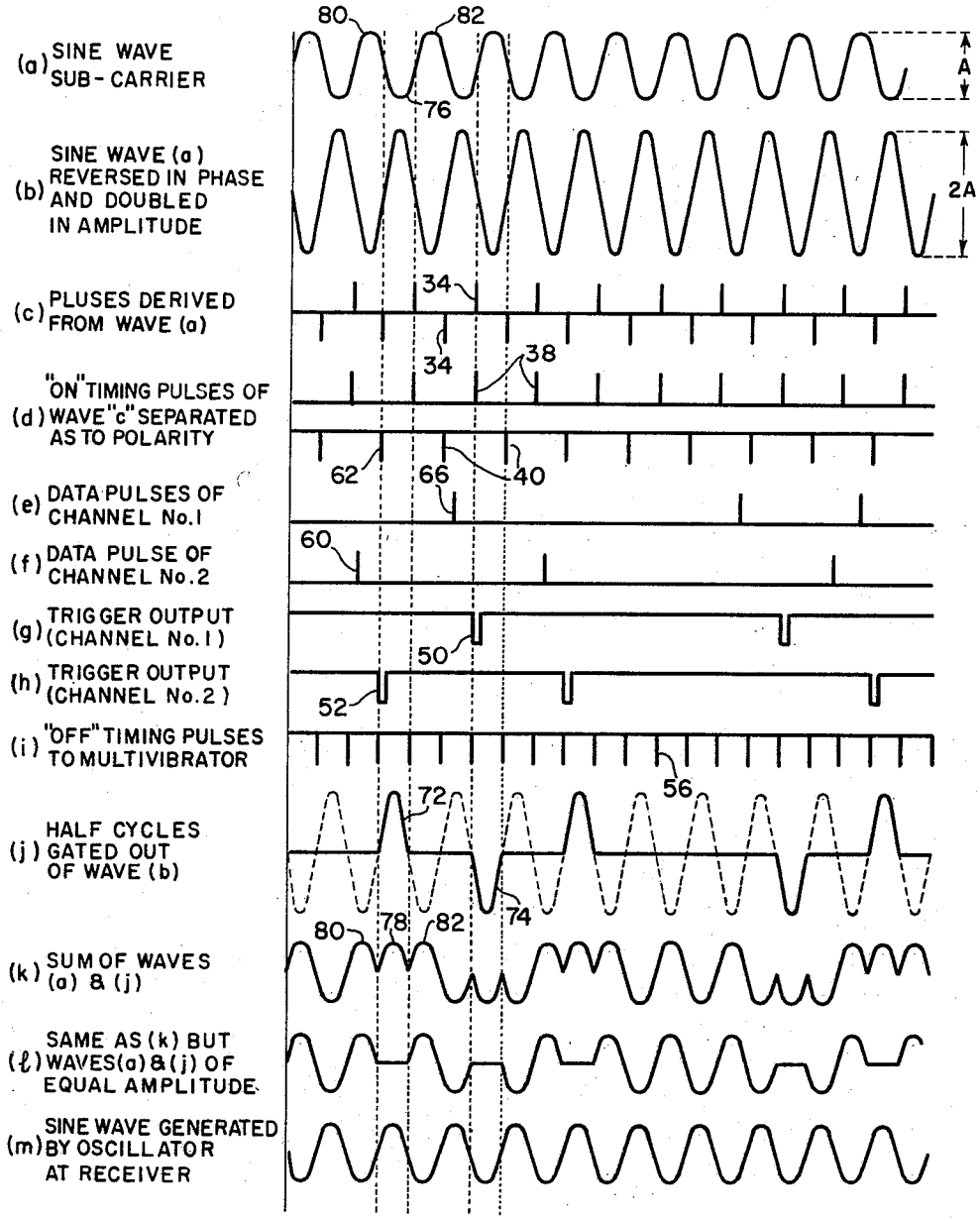
FIG. 2 is a set of waveforms helpful in explaining the operation of the circuit of FIG. 1.

It has been above brought out that one of the features of the present invention resides in the ability of the apparatus disclosed to transmit two channels of information by a single sub-carrier wave. It will be assumed that the intelligence in each of these information channels can be represented by pulses derived from any suitable source. One such source of data or intelligence pulses is identified by the reference character 42 (channel Number 1) and the remaining source of data pulses (channel Number 2) is identified by the reference 44. The output of source 42 (the data pulses of channel Number 1) is shown in FIG. 2 by the waveform (e), while in similar fashion the data pulse output of source 44 is represented by the pulse series (f). It will be noted that the intelligence to be conveyed is characterized by the time-spacing of successive pulses in the series, and can be brought about by means well known in the communication art. It is only necessary for an understanding of the present disclosure that such pulses be available for utilization by the invention system.

The data pulses derived from the source 42 are applied to a one-shot trigger circuit 46 which is of a type adapted to be conditioned when a data pulse is thus received from the source 42 so that an output variation 50 of negative polarity and short time duration is produced upon the subsequent reception by circuit 46 of the next succeeding positive "on" timing pulse 38 from the separator 36. In similar fashion, a second one-shot trigger circuit 48 is conditioned by the reception of one of the data pulses from source 44 (channel Number 2) so as to produce an output voltage variation 52 when the next succeeding negative polarity "on" timing 40 is received by circuit 48 from the separator 36. Each of the one-shot trigger circuits 46 and 48 is so designed that the reception of a timing pulse (38 or 40 as the case may be) activates the trigger circuit so that the leading edge of the output variation (50 or 52) is in time coincidence with the occurrence of a pulse 38 or 40. However, each trigger circuit 46 or 48 inherently incorporates a relatively small amount of time delay, so that the positive-going trailing edge of each output variation (50 or 52) occurs at a time such that each output pulse has a finite width. The reason for incorporating time delay in each of the trigger circuits 46 and 48 is to prevent the application of an "on" timing pulse 38 and 40 to a gate-control circuit simultaneously with the reception by the latter of an "off" timing pulse and thus detract from optimum operation of the system. This point will be brought out in greater detail as the present description proceeds.

Also shown in FIG. 1 is a multivibrator 54 which is preferably of the conventional "flip-flop" type. That is, the multivibrator 54 possesses two steady-state conditions one of which is brought about when either of the trigger circuit output variations 50 and 52 is applied thereto. As shown in FIG. 1, the output variation from circuit 46 consisting of the pulses 50 (wave (g) in FIG. 2) is combined with the voltage variation from trigger circuit 48 (which consists of the pulses 52 and is shown in FIG. 2 as the waveform (h)). These combined pulse outputs are fed to one section of the multivibrator 54 so that either of the pulses 50, 52 causes the multivibrator to assume one of its steady-state conditions. The remaining steady-state condition of multivibrator 54 is established through the reception by the second vibrator section of a negative "off" timing pulse 56 obtained by differentiating in a network 58 the output of the pulse-former 14. As shown in FIGS. 1 and 2, successive ones of the pulses 34 extend in opposite directions of polarity. However, when differentiated and clipped by the circuit 58, each of the pulses 34 appears as a negative pulse 56 for application to the second section of the multivibrator 54. It has been stated that each positive-going timing pulse 38 occurs at the beginning of each positive half-cycle of the sine-wave 12 (or wave (a) of FIG. 2) while each negative timing pulse 40 occurs at the beginning of each negative half-cycle of the sine-wave. Consequently, the trigger circuits 46 and 48 respectively pass the pulses 40 and 38 when these circuits have been conditioned through the reception thereby of a data pulse.

Referring now to FIG. 2, the wave (*f*), made up of the data pulses in channel #2, conditions the trigger circuit 48 when a data pulse (such as 60), is received thereby to pass the next succeeding control pulse of wave 40 which is received by the trigger circuit. This particular pulse so passed is identified in the drawing by the reference number 62. The pulse 62 (which in effect forms the leading edge of the output trigger circuit variation 52) acts upon the multivibrator 54 to result in the latter assuming one of its steady-state conditions in which a voltage is applied to gate 26 over conductor 64. In similar fashion, a data pulse in channel Number 1 (such as 66) conditions the trigger circuit 46 to pass the next succeeding timing pulse 38 and thereby cause the latter to form the leading edge of the output variation 50 to the multivibrator. This has the same effect on the multivibrator as the reception of a pulse 52. In other words, either of these pulses 50, 52 brings about the same steady-state condition of the multivibrator and causes a control voltage to be applied to gate 26 from the multivibrator over conductor 64. The multivibrator is so designed that when it has been placed in one of its steady-state conditions by either pulse 50 or 52, it is then returned to its other steady-state condition by the next succeeding one of the "off" timing pulses 56 received by the multivibrator from differentiator 58. This action of the multivibrator in response to the reception of a pulse 56 causes a control voltage to be produced which is applied to gate 26 over conductor 68. The gate 26 is so designed that it is opened by an impulse received thereby over conductor 64 and closed by the reception of an impulse over conductor 68. Disregarding the time delay incorporated in the trigger circuits 46 and 48, it may be broadly stated that the timing pulses 34 act to open gate 26 following reception of one of the data pulses from sources 42, 44 and the next succeeding pulse 56 derived from the same source as pulses 34 (in other words, the sine-wave 12) acts to close the gate 26. However, since only the timing pulses 38 are applied to the trigger circuit 46, the data pulses from source 42 are effective to pass through the trigger circuit 46 only these positive-going pulses 38, while the trigger circuit 48 following reception of a data pulse from source 44, passes to the multivibrator 54 only the next succeeding negative-going pulse 40.

As hereinbefore stated, the gate 26 is selectively operated by energy supplied thereto over the conductors 64—68 to pass therethrough particular half-cycles of the amplitude-doubled sine-wave (*b*). For example, a data pulse 60 applied to the trigger circuit 48 from source 44 conditions the trigger circuit to pass therethrough the next succeeding negative-going timing pulse 40 so as to produce for application to the multivibrator 54 a voltage variation 52. The multivibrator is activated by this variation 52 to open the gate 26. As seen from FIG. 2, the time occurrence of the variation 52 is such that it is produced essentially simultaneously (neglecting the time spacing between its leading and trailing edges) with the beginning of a positive half-cycle of the amplitude-doubled and phase-inverted wave (*b*). Consequently, a portion of wave (*b*) passes through the gate 26 to a junction point 70. Expressed differently, gate 26 is open during this particular interval of time. However, as soon as one of the negative-going pulses 56 from the differentiator 58 is received by the multivibrator 54, a voltage is developed in the conductor 68 to shut the gate 26. As can be seen from FIG. 2, this shutting of the gate 26 occurs at the precise instant when the half-cycle of wave (*a*) which has been passed through gate 26 crosses its zero axis. A representative half-cycle of wave (*b*) which has passed through gate 26 is identified in FIG. 2 by the reference number 72. The above action takes place because each "off" timing pulse 56 is derived from wave 12, and the latter as above stated is identical in phase and frequency to the wave (*a*) of FIG. 2 from which in turn the wave (*b*) is formed. Therefore, the data pulse 60 appearing in channel #2 has caused the selection of one-half cycle of wave (*b*) and has allowed this energy to reach point 70.

In similar fashion, a data pulse in channel #1 such, for example, as that represented by the reference numeral 66, passes the next positive-going timing pulse 38 to form the variation 50. This occurs in timed relation to the beginning of a negative half-cycle of wave (*b*), and the amplitude-doubled (with respect to wave (*a*)) pulse 74 is produced. Thus a series of positive pulses 72 are passed through gate 26 in accordance with the occurrence of data pulses in channel #2, and a further series of negative-going half-cycles of wave (*b*) are passed through gate 26 in accordance with the presence of successive data pulses in channel #1. These two series of positive and negative pulses, respectively, make up wave (*j*) of FIG. 2.

At the junction point 70 of FIG. 1 the two waves (*a*) and (*j*) are combined to form the wave (*k*). Since the half-cycles 72 gated out of wave (*b*) are twice the amplitude of each half-cycle of the sine-wave sub-carrier wave (*a*), and since the two waves are 180° out of phase, it will be seen that the addition of one of the half-cycles 72 to a corresponding half-cycle of wave (*a*) (such, for example, as that particular half-cycle indicated by the reference numeral 76) will result in the wave (*k*) containing a positive half-cycle 78 which lies between two adjacent positive half-cycles 80 and 82 of the original sine-wave. The addition of each of the succeeding portions of wave (*j*) to that of the basic subcarrier (*a*) will yield a wave such as (*k*) in which three successive half-cycles of the combined wave which appears at point 70 in FIG. 1 are of the same polarity. This wave (*k*) is utilized to modulate a standard sine-wave carrier as hereinbefore stated and represents the actual intelligence transmitted.

Figure 3:
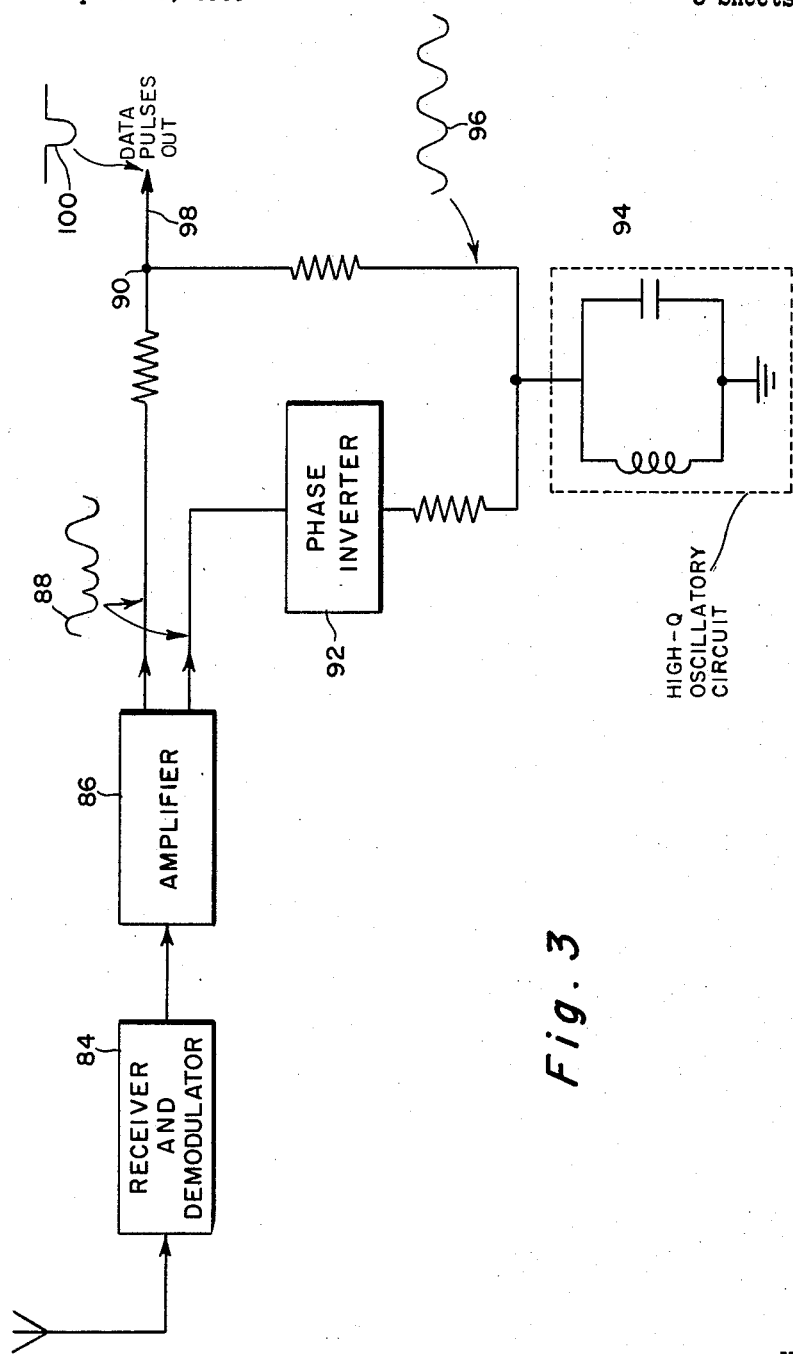
FIG. 3 is a schematic diagram, partially in block form, of a receiving circuit particularly adapted to receive energy transmitted by the system of FIG. 1.

In FIG. 3, is shown a preferred form of circuit for receiving energy transmitted by the system of FIG. 1. After passing through a conventional receiver and subcarrier demodulator 84 and an amplifier 86 the modulated sub-carrier wave 88 (which is the wave (*k*) of FIG. 2) is fed directly to an output circuit past a junction point 90. A portion of the same wave 88 is inverted in phase by a network 92 and employed to synchronize a high-Q oscillator circuit 94 which is of the type requiring a minor amount of external energy to sustain oscillation. In other words, the output of the phase inverter 92 merely regulates the frequency of operation of circuit 94 in accordance with the well known "fly-wheel" effect. The output of the oscillator 94 is thus essentially the wave (*m*) in FIG. 2. That is, it constitutes merely a phase-inverted version of the basic sine-wave (*a*). This voltage variation, identified in FIG. 3 by the reference number 96, is combined with wave 88 at the junction point 90. All of the energy in these two waves thus cancels out with the exception of the half-cycle portions representative of the pulses 72 and 74 of wave (*j*) which, instead of cancelling, possess an additive relationship. The actual intelligence present in the output conductor 98 is thus a series of both positive and negative pulses identical in all respects to those of wave (*j*) in FIG. 2. Conventional polarity-separating circuits (not shown) can be utilized to separate the positive and negative pulses into two separate channels for reconstitution of the original pulse data emanating from the sources 42 and 44 in FIG. 1.

It will be noted that it is possible to make use of the fundamental principles of the present invention without utilizing a wave (such as illustrated at (*b*) in FIG. 2) which is doubled in amplitude with respect to wave (*a*). If the half-cycles gated out of wave (*b*) are equal in amplitude to the half-cycles of the sine-wave (*a*) with which they are to be combined, then the resulting modulated wave will assume the configuration shown as (*l*) in FIG.

2. That is, the time portions occupied in wave (*l*) by the positive-going half-cycles 78, for example, will instead be of zero amplitude during this time period and in effect the wave (*l*) will contain gaps representative of the time occurrence of the various data pulses. However, this process is usually less satisfactory than that described in connection with FIG. 1, since less energy is present in the received signal and it is more difficult to derive the original intelligence. After phase cancellation between the waves 88 and 96, for example, any output data pulse (such as 100) in a circuit designed to produce a wave such as (*l*) of FIG. 2 will have only half the amplitude of the pulse obtained when the circuit arrangement of FIG. 1 is employed.

The differentiator 58 of FIG. 1 is of any standard type which receives both the positive- and negative-going pulses 34 derived from the sine-wave 12 and forms therefrom a very sharp voltage excursion extending in both positive and negative directions of polarity regardless of the direction of polarity of the pulse from which this excursion is formed. By clipping off all of the positive portion of each of these excursions, the negative pulse series 56 results.

The reason for introducing a small amount of time delay into the trigger circuits 46 and 48 is to preclude the application to the multivibrator 54 of one of the timing pulses 50, 52 concurrently with one of the timing pulses 56. If such were the case, the multivibrator would not necessarily recognize which particular one of its two steady-state conditions was desired for production of a control pulse in conductors 64 and 68. Expressed differently, an "open" pulse must be received by gate 26 before the reception thereby of a "shut" pulse, and this requires that any opening of the gate be slightly delayed with respect to the time instant at which a "shut" pulse is received. However, the amount of delay thus incorporated into the trigger circuits 46 and 48 is very slight. The width of pulses 50 and 52 has been greatly exaggerated in the drawing, and in practice only a very small portion of the initial surge of each of the half-cycles gated out of wave (*b*) will be clipped off. This will have a negligible effect on circuit operation.

Obviously many modifications and variations of the present invention are possible in the light of the above teachings. It is therefore to be understood that within the scope of the appended claims the invention may be practiced otherwise than as specifically described.

I claim:

1. In a communication system; a first source of pulses representing intelligence to be communicated; a second source of pulses also representative of intelligence to be communicated; means for generating a sine-wave of a constant frequency which is relatively high compared to the average repetition frequency of the intelligence pulses from said sources; means for deriving a series of evenly-spaced "on" timing pulses of alternate positive and negative polarity from the sine-wave so generated; a circuit for separating the said "on" timing pulses into two waves each of which contains only pulses of the same polarity; a multivibrator having two steady-state conditions and adapted to develop output energy variations representative thereof; a pair of trigger circuits to which the said two waves of positive and negative "on" timing pulses are respectively applied; means for connecting said pair of trigger circuits to respectively receive the intelligence pulses from said first and second sources thereof, the reception by either of said trigger circuits of an intelligence pulse from its respective source acting to condition such trigger circuit to pass the next positive or negative control pulse received thereby to said multivibrator to place the latter in the first of its steady-state conditions; means for differentiating all of the "on" timing pulses in said series, said multivibrator being placed in the second of its steady-state conditions by the reception of the next succeeding differentiated "on" timing pulse; means for developing a sine-wave sub-carrier having a frequency and amplitude corresponding to the sine-wave from which the said timing pulses are derived; means for forming from said sine-wave sub-carrier a second wave of opposite phase to said sine-wave carrier and with approximately twice the amplitude of the latter; a gate to which both second sine-wave and the output of said multivibrator are applied, whereby the reception by said gate of one of the output energy variations of said multivibrator will open said gate to pass one selected half-cycle of said amplified and phase-reversed sine-wave, and whereby the subsequent reception of one of the said differentiated "on" timing pulses by said gate will close the latter; means for combining the output of said gate with said sine-wave sub-carrier; a carrier-wave generator; and means for modulating by the combined sub-carrier wave the carrier wave output of said generator.

2. A communication system according to claim 1, in which said multivibrator is of the flip-flop type.

3. A communication system according to claim 1, in which each of said pair of trigger circuits incorporates a predetermined amount of time delay so that said multivibrator is caused to enter one of its steady-state conditions subsequent to the reception by a trigger circuit of one of the polarity-separated pulses derived from said "on" timing wave.

4. A system for impressing two channels of data on a single sub-carrier wave, said system comprising means for generating a first cyclically-varying voltage variation, means for deriving from the said first cyclic voltage variation a second voltage variation of identical frequency but of greater amplitude than said first variation and of opposite phase with respect thereto, means for gating out selected positive half-cycles of the said second voltage variation in accordance with the data present in one of said channels, means for gating out selected negative half-cycles of said second voltage variation in accordance with the data present in the other of said channels, and means for combining all of the half-cycles so gated out with said first voltage variation to yield a modulated sub-carrier wave in which the half-cycles gated out of said second voltage variation appear with an amplitude approximately equal to that of said first-mentioned wave.

5. In a communication system; means for generating a first sine-wave of substantially constant frequency; a first sine-wave of substantially constant frequency; means for generating a second sine-wave of a frequency identical to the first sine-wave but of increased amplitude and reversed phase; means for deriving from the first-mentioned sine-wave a pulse series in which a positive pulse is generated at the beginning of each positive excursion of said sine-wave and a negative pulse is generated at the beginning of each negative excursion of said sine-wave, the pulses of said series consequently alternating in polarity but having an equal time-spacing therebetween; a circuit for separating the alternate positive and negative pulses of said series into two pulse trains, each of which contains pulses of but a single polarity; a first source of data pulses the time spacing of which is representative of intelligence to be conveyed; a selector circuit; means for applying data pulses from said first source to said selector circuit whereby the latter will pass therethrough the next succeeding positive pulse of said train; a second source of data pulses representative of intelligence to be transmitted, the data pulses from said second source also having a time-spacing therebetween which varies in accordance with variations in said data; a second selector circuit; means for applying the data pulses from said second source to said second selector circuit so that each pulse thus received by said selector circuit results in the latter passing therethrough the next succeeding negative pulse of said train; a gating network adapted to pass therethrough selected portions of the phase inverted wave derived from said first mentioned sine-wave; a circuit for controlling the opening and closing said gate; means for deriving from said series of alternate positive and negative pulses an "off" output pulse series in which all of said pulses appear with the same polarity; means for applying to said gate-control circuit the pulses passed through each of said selector circuits in response to the application thereto of said data pulses, the pulses thus passed through said selector circuits acting to control the opening of said gate to allow passage thereto of a selected half-cycle of said phase-inverted wave; a circuit for applying to said gate-control circuit the series of single-polarity "off" pulses derived from said original series of alternate positive and negative pulses, whereby the next succeeding pulse in said "off" series operates to close said gate following an opening thereof, the closing of said gate occurring at the termination of a particular half-cycle of said phase-inverted wave, whereby a positive half-cycle of the latter will be gated out in response to a data pulse received from said first source and a negative half-cycle will be gated out in response to a data pulse received from said second source; a circuit for combining the half-cycles of said phase-inverted wave thus gated out with the first-mentioned sine-wave, whereby those portions of the combined wave which results will be of other than sine-wave configuration during those intervals in which the said gated half-cycles occur; a carrier wave generator; and means for modulating the output of said wave generator by the said combined wave.

6. A communication system according to claim 5, in which the said inverted wave is doubled in amplitude with respect to the first sine-wave from which it is derived, so that the energy present in each half-cycle of said combined wave will be essentially constant regardless of the modulation of said first-mentioned sine-wave by the particular half-cycles of said inverted wave which have been gated out.

7. The combination of claim 5, in which said gate-control circuit is in the form of a flip-flop multi-vibrator one section of which is adapted to receive pulses from either of the said selector circuits and the remaining section of which is adapted to receive one of the uni-directional pulses formed from said series of pulses having alternate positive and negative directions of polarity.

8. In a system for the transmission of intelligence occurring in two distinct channels, the combination of: a generator for developing a voltage variation of essentially sine-wave shape and of constant frequency; means for selecting a portion of the output of said generator and producing therefrom a further sine-wave of the same frequency as said first-mentioned sine-wave but of essentially twice the amplitude of the latter and with a 180° phase displacement with respect thereto; a network to which said first-mentioned is applied, said network acting to develop a positive pulse each time that the sine-wave applied thereto passes through zero voltage in a rising direction, and to generate a negative pulse each time that the said sine-wave passes through zero in descending direction; a circuit for separating the positive and negative pulses thus derived from said sine-wave into a pair of pulse trains each of which contains pulses of but a single polarity; a source of pulses the time spacing of which is representative of one intelligence channel to be transmitted; circuit means to which said intelligence pulses are applied to thereby select from one of the said uni-directional pulse series the next succeeding uni-directional pulse occurring therein; a second series of data pulses the time spacing of which is representative of the second intelligence channel to be transmitted; a network to which said second series of data pulses are applied to thereby select from the remaining one of the two said uni-directional pulse series the next succeeding uni-directional pulse of such second series; means for applying the uni-directional pulses selected from one of said series to select particular half-cycles of said phase-inverted and amplitude-doubled wave, all of these half-cycles so selected being of the same polarity; means for applying the uni-directional pulses selected from the second of said two series to select from the said phase-inverted and amplitude-doubled wave half-cycles thereof all of which extend in the same direction of polarity, such polarity being opposite to that of the half-cycles selected by said first series of uni-directional pulses; means for combining the half-cycles thus selected with the initially-generated sine-wave to thereby result in a modulation of the latter, this modulation being of such a nature that the modulated portions of the resulting wave are restricted to half-cycles thereof, these half-cycles containing energy which extends in a single direction of polarity which is the same as that of the sine-wave half-cycles lying on either side of the modulated half-cycle.

9. The combination of claim 8, in which the means for selecting a portion of the output of said sine-wave generator to develop an amplitude-doubled and phase-inverted wave includes an inductor one intermediate point of which is grounded, the sine-wave from said generator being applied to one end of said inductor and the phase-inverted end amplitude-doubled wave being derived from a point on said inductor which lies at a distance from said grounded point which is different from the distance from such point to that terminal from which the said first-mentioned sine-wave is derived, the two said derivation points lying on opposite sides of the said grounded point whereby the two derived waves are of opposite phase with respect to one another.

10. A system for receiving intelligence impressed upon a sub-carrier wave by means which includes amplitude-increasing and phase-inverting said sub-carrier, gating out selected half-cycles of the amplitude-increased and phase-inverted wave, combining the wave portions thus gated out with the original sub-carrier, and transmitting the sub-carrier wave, said receiving system including means for demodulating the received wave, an oscillator adapted to generate a sine-wave output identical to that of the said received sub-carrier and synchronized thereby, means for inverting the phase of the sine-wave produced by said oscillator, and means for combining this phase-inverted wave with the received energy whereby only the modulation contained in said received wave remains.

References Cited in the file of this patent

UNITED STATES PATENTS 2,262,764    Hull ---------------- Nov. 18, 1941